United States Patent Office 3,822,147
Patented July 2, 1974

3,822,147
INSULATED ELECTRICAL CONDUCTOR AND
COILS FORMED THEREOF
Ernest C. Koerner and William W. Wareham, Fort Wayne, Ind., assignors to Phelps Dodge Magnet Wire Company, Fort Wayne, Ind.
Filed May 5, 1972, Ser. No. 250,750
Int. Cl. C08g 20/32; H01b 7/02
U.S. Cl. 117—218                                16 Claims

ABSTRACT OF THE DISCLOSURE

A metal conductor coated with multiple layers of a cured polyaromatic, polycarboxylic aromatic imide resin and a cured phenoxy resin. The layers are superposed and may be arranged so as to provide an inner layer of imide resin and an outer layer of phenoxy resin, an inner layer of phenoxy resin and an outer layer of imide resin, or both inner and outer layers of imide resin with a mediate layer of phenoxy resin sandwiched therebetween. Magnet wire made in accordance with the invention has special utility in oil-filled transformers.

BACKGROUND OF THE INVENTION

Field of the Invention

This invention relates to an improved insulated conductor and more specifically to an improved magnet wire which has special utility in the form of coils for oil-filled transformers.

DESCRIPTION OF THE PRIOR ART

Magnet wire comprising a metal conductor coated with a layer of a cured polyaromatic, polycarboxylic aromatic imide resin has heretofore been proposed. A layer of such a resin has been proposed as an outer layer on a magnet wire having a base insulation comprising a thermoset polyester, i.e., U.S. Pat. No. 3,022,200 entitled "Magnet Wire and Method of Making the Same" dated Feb. 20, 1962, and a magnet wire having a base insulation comprising an epoxy resin, i.e., U.S. Pat. No. 3,528,852 entitled "Dual-Coated Electrical Conductor" dated Sept. 15, 1970. Additionally, a resin of the same type has been proposed as a base insulation material under a layer of epoxy resin and an outer layer over a base insulation of oleo resinous or acrylic resin material.

In the design of oil-filled transformers, great demands are placed upon the type and quality of insulation materials. Because of the nature of this application, the insulating material must be compatible with oil and possess excellent hydrolytic stability. Presently, oil-filled transformers utilize magnet wire insulated with single layers of Formvar, epoxy or acrylic resin materials.

Today's transformers are being subjected to frequent overload conditions and sudden overvoltage line surges placing more demands upon the insulation of the magnet wire used. Recent market analyses have shown that it is not uncommon for transformers to be operated as much as 100% above their rated loadings, for example, a 25 kva. transformer during peak loading could be distributing as much as 50 kva. While the normal operating temperatures of these transformers was considered to be about 120° C., the temperatures of these transformers during peak requirements have been estimate to be as high as from about 160 to about 180° C.

Under these conditions, the physical properties of the insulation as evidenced by the resistance to deformation under high temperatures and pressures and the resistance to "crazing" and the chemical stability of the insulation, particularly its resistance to hydrolysis, and the electrical properties of the insulation, are required to be improved. Formvar, epoxy and acrylic insulations have a limited resistance to deformation under heat and pressure, thus resulting in continued danger of shorts between neighboring conductors. Formvar insulations also tend to easily darken and discolor the oil of the transformer when exposed to moderately high temperatures. Epoxy insulating materials have traditionally been plagued by their relatively poor physical properties as evidenced by "crazing" which reduces their dielectric integrity. Two types of crazing occur. One type of crazing can be caused by selective solvents that craze the film when the film is wet. Another and more serious type of crazing is so-called "dry crazing" that exists in film when manufactured. Severely crazed insulation provides questionable insulation under high impulse voltages such as that encountered during lightning surges. Acrylic resins are relatively poor insulating materials at room temperature and the electrical losses are significant at higher temperatures.

As an electrical conductor, aluminum is more economical than copper at today's metal prices. However, aluminum, be it E.C. grade or the so-called "alloys," is inherently softer than copper and has a low tensile strength compared to copper. This means that an aluminum conductor can be more easily stretched and can be more severely damaged during the winding of coils. This cannot help but cause more severe "hot spots" in aluminum windings and requires still better turn insulation to compensate for this phenomenon.

For these reasons, it is desirable to produce an improved magnet wire for use in oil-filled transformers.

SUMMARY OF THE INVENTION

It is therefore the primary object of this invention to provide an improved magnet wire.

Another object of this invention is to provide an insulation system which does not craze and has improved resistance to deformation under heat and pressure and improved electrical properties.

Another object of this invention is to provide an improved insulation system comprising a layer of a cured polyaromatic polycarboxylic aromatic imide resin and a layer of a cured phenoxy resin.

Another object of this invention is to provide an improved magnet wire which is useful in oil-filled transformers and which is competitive in cost to similar magnet wires insulated with Formvar resins.

Yet another object of this invention is to provide a coil of an improved magnet wire comprising a conductor coated with a layer of a cured polyaromatic, polycarboxylic aromatic imide resin and a layer of a cured phenoxy resin.

A further object of this invention is to provide an improved magnet wire for use in oil-filled transformers having multiple layers of resinous insulation materials which can be applied in one continuous operation by conventional methods and baked and cured at the same conditions without any layer of insulation suffering from degradation.

In the broader aspects of this invention, there is provided an improved insulated metal conductor having a layer of a cured polyaromatic, polycarboxylic aromatic imide resin and a layer of a cured phenoxy resin. The phenoxy resin can be applied as the inner layer, the outer layer or sandwiched between an inner layer and an outer layer, both of a polyaromatic, polycarboxylic aromatic imide resin. The invention also includes coils formed of magnet wire of the invention and an oil-filled transformer having as a part thereof such a coil.

DESCRIPTION OF THE PREFERRED EMBODIMENT

The magnet wire of the invention comprises a metal conductor coated with a layer of a cured polyaromatic, polycarboxylic aromatic imide resin and a layer of a cured phenoxy resin. The conductor can be either a copper conductor or an aluminum conductor. Further, the conductor can be provided with an inner layer of phenoxy resin and an outer layer of polyaromatic, polycarboxylic aromatic imide resin, an inner layer of a polyaromatic polycarboxylic aromatic imide resin and an outer layer of a phenoxy resin, or a layer of phenoxy resin sandwiched in between an inner layer and an outer layer both of a polyaromatic, polycarboxylic aromatic imide resin. Each of the specific embodiments incorporates the invention herein disclosed.

The phenoxy resins which are useful in the invention have been available concurrently with the well-known epoxy resins since the early 1960's. As mentioned hereinabove, epoxy insulations have been used as a magnet wire insulation in oil-filled transformers. Magnet wires having base insulations of epoxy resins overcoated with linear polymers have been produced for this purpose, but none of these have been commercially successful.

The phenoxy resins should not be confused with epoxy resins. While phenoxy resins and epoxy resins are made from similar starting materials, phenoxy resins have a molecular weight in excess of 15,000 as measured by cryoscopic or ebullioscopic methods do not have any reactive epoxy groups (only a possibility of some terminal epoxy groups) within the polymeric chain and possess entirely different physical, chemical and electrical properties. In general, phenoxy resins have considerably higher molecular weights than epoxy resins capable of forming flexible free films and do not have to be cured as do the epoxy resins by a chemical hardener or cross-linking agent or the like.

Phenoxy resins prepared from bisphenol A and epichlorohydrin having a molecular weight in excess of about 15,000 as measured by cryoscopic or ebullioscopic methods are useful in the invention. Such resins are sold by Union Carbide Corporation under the product designation: Bakelite Brand Phenoxy 8 Resin PKDA–8500 by The Dow Chemical Company under the product designation Dow 2242.3 resin, and by Shell Chemical Company under the product designation: Eponol 53 L32 resin. These resins are all believed to have the following formula when cured:

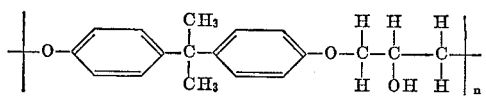

where $n$ is greater than about 75. Other phenoxy resins of the general description given above can also be used.

The polyaromatic, polycarboxylic aromatic imide resins that are useful in the invention include polyimide and polyamide-imide resins. Specific resins which have been found to be useful are the polyamide-imide resins made from trimellitic acid such as AI–10 resin, sold by Amoco Chemical Company, and the resins made from pyromellitic dianhydride and oxydianiline such as sold under the product designation ML by E. I. du Pont de Nemours and Company.

Surprisingly, a conductor insulated with a layer of an effectively cross-linked and hardened phenoxy resin and a polyaromatic, polycarboxylic aromatic imide resin was found to be an excellent magnet wire for use in oil-filled transformers. Such a magnet wire was found to possess all of the desirable properties of the best prior art magnet wires used for this purpose and without their shortcomings and weaknesses. While phenoxy resins have a reputation for being susceptible to crazing, the multi-coated magnet wire of this invention exhibits no crazing and is very suitable for use in oil-filled transformers. Comparative data illustrating the properties of aluminum conductors coated with the improved insulation of the invention and the conventional Formvar, epoxy and acrylic insulations are shown in Table I.

The multi-coated magnet wire of the invention is shown to have high heat shock and solvent resistance (pass 20% 3X ½ hr. at 220° C.), good cut-thru (above 260° C.), toughness (pass snap IX, unilateral scrape above 1000), flexibility and windability (pass 2% 1X flexibility, elongation above 15%), and a high dielectric strength (above 8000 R.T. volts). Also, the multi-coated magnet wire of the invention exhibits good resistance to deformation under heat and pressure (cut-thru and fusion test) whereby fusion or sticking of contiguous portions of the conductor and the resultant tearing of the insulation such as may result from sudden overvoltage line surges to which today's transformers are being subjected are eliminated.

Further, the multi-coated magnet wire of the invention has excellent (above 2000) hydraulitic stability as compared with conventional Formvar, epoxy and acrylic insulations. To illustrate the improved hydraulitic stability of the above insulation of the invention, a sealed tube hydraulitic stability test, using two drops of water and ageing for 100 hours at 150° C. was conducted with each of the insulations tested in Table I. The results were that twisted pairs of magnet wire insulated with the insulation of the invention possessed 3,344 volts per mil, whereas twisted pairs insulated with conventional Formvar insulation possessed 3,045 volts per mil, twisted conductor pairs insulated with conventional epoxy resin possessed 2,267 volts per mil and twisted conductor pairs insulated with conventional acrylic resin possessed 1,425 volts per mil.

FIG. 1 illustrates similar data comparing the insulation of the invention and conventional Formvar insulation over much longer periods of time. Data for conventional epoxy insulation is not shown as the test results were erratic for reasons unknown. FIG. 2 illustrates data relating to the variance of the dielectric strength in volts of the insulation of the invention and conventional Formvar and epoxy insulation with temperature. FIG. 3 illustrates and compares the average life of the insulation of the invention with the average life of conventional Formvar and epoxy insulations at a constant temperature of operation. FIGS. 1, 2 and 3 each compare data of heavy build insulations applied to 18 A.W.G. conductors. FIGS. 1, 2 and 3 do not illustrate data of conventional acrylic insulation, inasmuch as the dielectric strength and the average life of such insulation is so low that a comparison with the data of the insulation of the invention does not add to the disclosure.

As mentioned above, it is highly desirable to apply the multiple coatings of resinous material to one continuous operation by conventional methods. This involves baking and curing each layer of resin material at the same conditions without any layer of insulation suffering from degradation. Preferably, the multiple layers would be simultaneously applied by cross-stringing the oven of a conventional wire coating machine. Surprisingly, in view of the differences in baking and curing conditions for phenoxy resins and polyaromatic, polycarboxylic aromatic imide resins and the effects on phenoxy resins by the solvents for polyaromatic, polycarboxylic aromatic imide resins, i.e., N-methyl pyrrolidone, good results can be obtained by applying successive layers of a resin simultaneously by cross-stringing the oven of a conventional wire coating machine and curing and baking each layer at the same conditions. Applicant has selectively cross-linked the phenoxy resins by reacting the same with aromatic polyfunctional materials having reactive groups capable of reacting with phenoxy-hydroxyl groups, i.e., methylol containing resins, isocyanates, isocyanurates, urethanes, melamines, anhydrides, formaldehydes and diamines, and the like, as disclosed herein to accomplish this surprising result.

The following Examples serve to further illustrate the invention:

EXAMPLES I AND II (According to U.S. Pat. No. 3,528,852)

A solution is formed by dissolving 115.0 grams of epoxy resin (1010 epoxy resin solution, as sold by Shell Chemical Company) and 160 grams of a butylated urea resin (Beetle 227–8 resin solution, as sold by American Cyanamid) in 165.0 grams of cresylic acid (No. 9 cresylic acid, as sold by Pitt-Consol Company), 165.0 grams of an aromatic solvent (NJ–100, as sold by Hoosier Solvents and Chemicals Corporation) and 100.0 grams of diacetone alcohol by stirring the same at room temperature at atmospheric pressure. The resultant solution is filtered, if necessary. The viscosity of the resulting solution at 30° C. was measured at about 175 cps. utilizing a Brookfield viscometer and a resin solution of approximately 35% weight resin and 65% weight solvent.

The resultant solution was then applied to a bare copper and a bare aluminum conductor having no insulation thereon employing dies and a conventional wire coating tower at 33 feet per minute, having bank temperatures of 625° F., 725° F. and 825° F. Four coats were applied in this manner.

A conventional solution of amide-imide resin (AI–537 wire enamel, as sold by Amoco Chemical Company) was then applied to the same conductors over the layer of epoxy resin in a conventional manner employing dies and a conventional wire coating tower at the same speed and curing and baking conditions. Two coats were applied in this manner. The properties of the resultant magnet wire are shown in Table I.

EXAMPLES III THROUGH VI (According to U.S. Pat. No. 3,528,852)

The resin solutions of Example I were applied to bare copper and aluminum conductors in a manner similar to that described in Example I, except that the respective coats were applied in Examples III and IV at 36 feet per minute and with bank temperatures of 625° F., 725° F. and 825° F. Otherwise Examples III and IV are identical to Examples I and II. In Examples V and VI, the respective coats were applied at 39 feet per minute and with bank temperatures of 625° F., 725° F. and 825° F. Otherwise, Examples V and VI are identical to Examples I through IV. The properties of the resultant magnet wires are compared with the properties of the magnet wires of Examples I and II in Table II.

EXAMPLES VII AND VIII

A solution is formed by dissolving 5.262 pounds of phenoxy resin (53–L–32 resin solution, as sold by Shell Chemical Company), 0.832 pound of butylated urea formaldehyde resin (Beetle 227–8 resin solution, as sold by American Cyanamid) and 0.292 pound of a methylated melamine resin solution (Cross-Linking Agent 370, as sold by American Cyanamid) in a solution comprising 0.052 pound of tris (toluene isocyanate) isocyanurate (Mondur SH, as sold by Mobay Chemical Company) and 1.42 pounds of O-Cresol and 0.667 pound of an aromatic solvent (NJ–100, as sold by Hoosier Solvents and Chemicals Corporation). The resultant solution is filtered, if necessary. The viscosity of the solution at about 100° F. was measured at about 700 cps. utilizing a Brookfield viscometer and a resin solution of approximately 28.36% weight resin and 71.64% solvent.

A second solution is formed by dissolving 60 grams of trimellitic acid anhydride in 700 grams of N-methyl pyrrolidone and 129 grams of an aromatic solvent (NJ–100, as sold by Hoosier Solvents and Chemicals Corporation) by stirring the same at room temperature and atmospheric pressure. Both the aromatic solvent and the N-methyl pyrrolidone contain less than 0.12% weight water. After a clear solution is obtained, 78 grams of p,p'-diphenyl methane diisocyanate (Multrathane M, as sold by Mobay Chemical Company) is added to the solution and the solution is mixed very slowly for about 30 minutes. The solution is then allowed to stand, without stirring, at about 65° C. at atmospheric pressure for about 12 hours. The solution is then once again agitated and the solution temperature is raised to about 200° C. The solution is maintained at this temperature and atmospheric pressure and agitated for about 2 hours. A condenser is used to prevent loss. The resultant amide-imide resin solution is cooled to room temperature and filtered, if necessary. The solution is adjusted by dilution to a resin solution of approximately 25% weight resin and 75% weight solvent.

The phenoxy resin solution was then applied in four consecutive coats to a bare copper conductor and a bare aluminum conductor having no insulation thereon, and, subsequently, two consecutive coats of the amide-imide resin solution were superposed on the layer of phenoxy resin employing dies and a conventional wire coating tower at 33 feet per minute having bank temperatures of 625° F., 725° F. and 825° F. This was achieved simultaneously by cross-stringing the oven of a conventional wire coating machine. The properties of the magnet wire of Examples VII and VIII are shown and compared with the properties of the magnet wire of Examples I through VI in Table II.

EXAMPLES IX THROUGH XII

The resin solutions of Examples VII were applied to bare copper and aluminum conductors in a manner similar to that described in Example VII except that the respective coats were applied in Examples IX and X at 36 feet per minute and with bank temperatures of 625° F., 725° F. and 825° F. Otherwise, Examples IX and X are identical to Examples VII and VIII. In Examples XI and XII, the respective coats were applied at 39 feet per minute and with bank temperatures of 625° F., 725° F. and 825° F. Otherwise Examples XI and XII are identical to Examples VII and VIII. The properties of the resultant magnet wires are compared with the properties of the magnet wires of Examples I through XII in Table II.

EXAMPLES XIII AND XIV

A solution is formed by dissolving 5.807 pounds of phenoxy resin (53–L–32 resin solution, as sold by Shell Chemical Company), 0.919 pound of butylated urea formaldehyde resin (Beetle 227–8 resin solution, as sold by American Cyanamid) and 0.249 pound of a methylated melamine resin solution (Cross-Linking Agent 370, as sold by American Cyanamid) in 0.168 pound of Cellosolve acetate solvent, 0.039 pound of tris (toluene isocyanate) isocyanurate (Mondur SH, as sold by Mobay Chemical Company) and 0.282 pound of an aromatic solvent (NJ–100), as sold by Hoosier Solvents and Chemicals Corporation) were added to the solution with good agitation. The resultant solution is filtered, if necessary. The viscosity of the solution at about 100° F. was measured at about 1200 cps. utilizing a Brookfield viscometer and a resin solution of approximately 30.12% weight resin and 69.88% weight solvent.

A second solution is formed by dissolving 60 grams of trimellitic acid anhydride in 600 grams of N-methyl pyrrolidone and 110 grams of an aromatic solvent (NJ–100, as sold by Hoosier Solvents and Chemicals Corporation) by stirring the same at room temperature and atmospheric pressure. Both the aromatic solvent and the N-methyl pyrrolidone contain less than 0.12% weight water. After a clear solution is obtained, 78 grams of p,p'-diphenyl methane diisocyanate (Multrathane M, as sold by Mobay Chemical Company) is added to the solution and the solution is then allowed to stand, without stirring at about 80° C. at atmospheric pressure for about 5 hours. The solution is then once again agitated and the solution temperature is raised to about 200° C. The solution is maintained at this temperature and atmospheric pressure and agitated for about 2 hours. A condenser is used to prevent loss. The resultant amide-imide resin solution is cooled to room temperature and filtered, if necessary. The solution is adjusted by dilution to a resin solution of approximately 25% weight resin and 75% weight solvent.

The phenoxy resin solution was then applied in four consecutive coats to a bare copper conductor and a bare aluminum conductor having no insulation thereon, and, subsequently, two consecutive coats of the amide-imide resin solution were superposed on the layer of phenoxy resin employing dies and a conventional wire coating tower at 23 feet per minute using bank temperatures of 500° F., 700° F. and 800° F. This was achieved simultaneously by cross-stringing the oven of a conventional wire-coating machine. The properties of the magnet wire of Examples VIII and XIV are shown and compared with the properties of the magnet wire of Examples I through XII in Table II.

EXAMPLES XV AND XVI

A solution is formed by dissolving 4.286 pounds of phenoxy resin (Dow 2242.3 resin solution, as sold by Dow Chemical Company), 1.695 grams of butylated urea formaldehyde resin (Beetle 227–8 resin solution, as sold by American Cyanamid) and 0.299 pound of a methylated melamine resin solution (Cross-Linking Agent 370, as sold by American Cyanamid), 0.027 pound of tris (toluene isocyanate) isocyanurate (Mondur SH, as sold by Mobay Chemical Company), 0.082 pound of cresylic acid (Pitt-Consol No. 9 solvent as sold by Pitt-Consol Company) and 1.357 grams of O-Cresol. Finally, 0.678 pound of an aromatic solvent (NJ–100, as sold by Hoosier Solvents and Chemicals Corporation) is added to the originally formed resin solution and mixed thoroughly. The resultant solution is filtered, if necessary. The viscosity of the solution at about 100° F. was measured at about 700 cps. utilizing a Brookfield viscometer and a resin solution of approximately 33.97% weight resin and 66.03% weight solvent.

An amide-imide resin solution is formed in accordance with either Example VII or XIII.

The phenoxy resin solution was then applied in four consecutive coats to a bare copper conductor and a bare aluminum conductor having no insulation thereon, and, subsequently, two consecutive coats of the amide-imide resin solution were superposed on the layer of phenoxy resin employing dies and a conventional wire coating tower at 15 feet per minute using bank temperatures of 475° F., 600° F. and 700° F. This was achieved simultaneously by cross-stringing the oven of a conventional wire coating machine. The properties of the magnet wire of Examples XV and XVI are shown and compared with the properties of the magnet wire of Examples I through XVIII in Table II.

EXAMPLES XVII AND XVIII

A mixture is formed of 0.039 pound tris (toluene isocyanate) isocyanurate (Mondur SH, as sold by Mobay Chemical Company) in 0.230 pound of an aromatic solvent (NJ–100, as sold by Hoosier Solvents and Chemicals Corporation) and 0.494 pound of phenol and 0.494 pound of cresylic acid (Pitt-Consol No. 9 solvent, as sold by Pitt-Consol Company). 0.187 pound of Cellosolve acetate solvent, 6.061 pounds of phenoxy resin (53–L–32 resin solution, as sold by Shell Chemical Company), 0.959 pound of a butylated urea formaldehyde resin (Beetle 227–8 resin solution, as sold by American Cyanamid), and 0.122 pound of a methylated melamine resin solution (Cross-Linking Agent 370, as sold by American Cyanamid) are added to the continuously stirred mixture. The mixture is continuously stirred for an additional 30 minutes to insure complete mixing. The resultant solution is filtered, if necessary. The viscosity of the solution at about 100° F. was measured at about 1000 cps. utilizing a Brookfield viscometer and a resin solution of approximately 30.2% weight resin and 69.98% weight solvent.

An amide-imide resin solution is formed in accordance with either Example VII or XIII. The phenoxy resin solution was then applied in four consecutive coats to a bare copper conductor and a bare aluminum conductor having no insulation thereon, and, subsequently, two consecutive coats of the amide-imide resin solution was superposed on the layer of phenoxy resin employing dies and a conventional wire coating tower at 35 feet per minute using bank temperatures of 550° F., 710° F. and 825° F. This was achieved simultaneously by cross-stringing the oven of a conventional wire-coating machine. The properties of the magnet wire of Examples XVII and XVIII are shown and compared with the properties of the magnet wire in Examples I through XVI in Table II.

EXAMPLES XIX AND XX

A mixture is formed of 1580 grams of phenoxy resin (Dow 2242.3 resin solution, as sold by Dow Chemical Company) and 7.5 grams of methylene dianiline. The mixture is heated to about 100° C. and stirred. After a continuous stirring at 100° C. for about 1 hour, the mixture is cooled to a temperature below 50° C., stirring is continued, and 325 grams of butylated urea formaldehyde resin (Beetle 27–8 resin solution, as sold by American Cyanamid) and 32.5 grams of a methylated melamine resin solution (Cross-linking Agent 370, as sold by American Cyanamid), 250 grams of phenol and 250 grams of cresylic acid (Pitt-Consol No. 9 solvent, as sold by Pitts-Consol Company) are added to the mixture. Finally, 300 grams of an aromatic solvent (NJ–100, as sold by Hoosier Solvents and Chemicals Corporation) is added to the mixture. The mixture is continuously stirred for approximately 30 minutes to insure complete mixing. The resultant solution is filtered, if necessary, the viscosity of the solution at about 85° F. was measured at about 1300 cps. utilizing a Brookfield viscometer and a resin solution of approximately 30.34% weight resin and 69.66% weight solvent.

An amide-imide resin solution is formed in accordance with either Example VII or XIII.

The phenoxy solution was then applied in four consecutive coats to a bare copper conductor and a bare aluminum conductor having no insulation thereon, and, subsequently, two consecutive coats of the amide-imide resin solution were superposed on the layer of phenoxy resin employing dies and a conventional wire coating tower at 15 feet per minute using bank temperatures of 475° F., 600° F. and 700° F. This was achieved simultaneously by cross-stringing the oven of a conventional wire-coating machine. The properties of the magnet wire of Examples XIX and XX are shown and compared with the properties of the magnet wire of Examples I through XVIII in Table II.

EXAMPLES XXI AND XXII

A solution is formed by dissolving 5.807 pounds of phenoxy resin (53–L–32 resin solution, as sold by Shell Chemical Company), 0.919 pound of a butylated urea formaldehyde resin (Beetle 227–8 resin solution, as sold by American Cyanamid) and 0.249 pound of a methylated melamine resin solution (Cross-Linking Agent 370, as sold by American Cyanamid) in 0.168 pound of Cellosolve acetate solvent, 0.039 pound of tris (toluene isocyanate) isocyanurate (Mondur SH, as sold by Mobay Chemical Company) and 0.282 pound of an aromatic solvent (NJ–100, as sold by Hoosier Solvents and Chemicals Corporation) were added to the solution with good agitation. The resultant solution is filtered, if necessary. The viscosity of the solution at about 100° F. was measured at about 1200 cps. utilizing a Brookfield viscometer and a resin solution of approximately 30.12% resin and 69.88% weight solvent.

The polyaromatic polycarboxylic aromatic imide solution was purchased from E. I. du Pont de Nemours and Company under the product designation "ML." This is an imide resin solution believed to be the reaction product of pyromellitic dianhydride and oxydianiline.

The phenoxy resin solution was then applied in four consecutive coats to a bare copper conductor and a bare aluminum conductor having no insulation thereon, and, subsequently, two consecutive coats of the imide resin solution were superposed over the layer of phenoxy resin employing dies and a conventional wire coating tower at 35 feet per minute using bank temperatures of 550° F., 710° F. and 825° F. This was achieved simultaneously by cross-stringing the oven of a conventional wire coating machine. The properties of the magnet wire of Examples XXI and XXII are shown and compared with the properties of the magnet wire of Examples I through XX in Table II.

EXAMPLES XXIII THROUGH XXVIII

A mixture is formed of 5.426 pounds of phenoxy resin (53-L-32 resin solution, as sold by Shell Chemical Company) and 0.22 pound of methylene dianiline. The mixture is heated to about 100° C. and stirred. After a continuous stirring at 100° C. for about 1 hour, the mixture is cooled to a temperature below 50° C., stirring is continued, and 0.893 pound of a butylated urea formaldehyde resin (Beetle 227-8 resin solution, as sold by American Cyanamid), 0.089 pound of a methylated melamine resin solution (Cross-Linking Agent 370, as sold by American Cyanamid), 0.549 pound of phenol and 0.549 pound of cresylic acid (Pitt-Consol No. 9 solvent, as sold by Pitt-Consol Company) are added to the mixture. Finally, 0.825 pound of an aromatic solvent (NJ-100, as sold by Hoosier Solvents and Chemicals Corporation) is added to the mixture. The mixture is continuously stirred for approximately 30 minutes to insure complete mixing. The resultant solution is filtered, if necessary. The viscosity of the solution at about 100° F. was measured at 700 cps. utilizing a Brookfield viscometer and a resin solution of approximately 27.32% weight resin and 72.68% weight solvent.

An amide-imide resin solution is formed in accordance with either Example VII or XIII.

The amide-imide resin solution was then applied in two consecutive coats to a bare copper conductor and a bare aluminum conductor having no insulation thereon, and, subsequently, four consecutive coats of the phenoxy resin solution were superposed on the layer of amide-imide resin. This was achieved simultaneously by cross-stringing the oven of a conventional wire coating machine at 12 feet per minute, 15 feet per minute and 18 feet per minute, having bank temperatures of 475° F., 600° F. and 700° F.

The properties of the magnet wire of Examples XXIII through XXVIII are shown and compared with the properties of the magnet wire of Example I through XXII in Table II.

EXAMPLES XXIX AND XXX

A solution is formed by dissolving 5.807 pounds of phenoxy resin (53-L-32 resin solution, as sold by Shell Chemical Company), 0.919 pound of a butylated urea formaldehyde resin (Beetle 227-8 resin solution, as sold by American Cyanamid) and 0.249 pound of a methylated melamine resin solution (Cross-Linking Agent 370, as sold by American Cyanamid) in 0.168 pound of Cellosolve acetate solvent, 0.039 pound of tris (toluene isocyanate) isocyanurate (Mondur SH, as sold by Mobay Chemical Company and 0.282 pound of an aromatic solvent (NJ-100, as sold by Hoosier Solvents and Chemicals Corporation) were added to the solution with good agitation. The resultant solution is filtered, if necessary. The viscosity of the solution at about 100° F. was measured at about 1200 cps. utilizing a Brookfield viscometer and a resin solution of approximately 30.12% resin and 69.88% weight solvent.

An amide-imide resin solution is formed in accordance with either Example VII or XIII. The amide-imide resin solution was then applied in two successive coats to a bare copper conductor and a bare aluminum conductor having no insulation thereon, and, subsequently, four consecutive coats of the phenoxy resin solution were superposed on the layer of amide-imide resin. This was achieved simultaneously by cross-stringing the oven of a contional wire coating machine at 15 feet per minute, having bank temperatures of 475° F., 600° F. and 700° F. The properties of the magnet wire of Examples XXIX and XXX are shown and compared with the properties of the magnet wire of Examples I through XXVIII in Table II.

EXAMPLES XXXI AND XXXII

The amide-imide resin of Examples XXIX and XXX was applied in a single coat to a bare copper and aluminum conductor having no insulation thereon, and subsequently, four consecutive coats of the phenoxy resin of Examples XXIX and XXX were superposed on the layer of amide-imide resin to form a base insulation layer. Subsequently a single coat of the amide-imide resin was superposed on the base insulation layer. These coats were applied employing dies and a conventional wire coating tower at 23 feet per minute using bank temperatures of 500° F., 700° F. and 800° F., simultaneously, by cross-stringing the oven of a conventional wire-coating machine. The properties of the magnet wire of Examples XXXI and XXXII are shown and compared with properties of the magnet wire of Examples I through XXX in Table I.

EXAMPLES XXXIII AND XXXIV

The amide-imide resin and phenoxy resin solutions of Example XVII was applied to a bare copper conductor and a bare aluminum conductor in the same manner as described in Examples XXXI and XXXII. The three layers of insulation were applied simultaneously, the base insulation layer being an amide-imide resin applied in a single coat, and a mediate layer of insulation being a phenoxy resin applied in four consecutive coats, the top layer being an amide-imide resin applied in a single coat. These coats were applied employing dies and a conventional wire coating tower at 36 feet per minute using bank temperatures of 625° F., 725 F. and 825° F., simultaneously, by cross-stringing the oven of a conventional wire coating machine. The properties of the magnet wire of Examples XXXIII and XXXIV are shown and compared with the properties of the magnet wire of Examples I through XXXII in Table I.

EXAMPLES XXXV THROUGH LXII

Representative samples of the magnet wire produced in accordance with Examples VII through XXXIV were used to manufacture several 25 kva., single-phase, 60 hertz, 7200-120/240 volt, pole-type transformers. The transformers manufactured were identical in all respects to the transformers sold by Moloney Electric Company except for the magnet wire used therein. Conventionally, transformers manufactured by Moloney Electric Company use Formvar resin insulated copper conductors. Winding of the transformer coils of the wire produced in accordance with the invention progressed without difficulty and the magnet wire appears to have at least the same windability as the conventional Formvar magnet wire. All of the transformers made with magnet wire made in accordance with the above-identified Examples when tested with conventional Formvar insulated copper conductor magnet wire transformers compared favorably with the conventional transformers.

The "bottle test" used herein was designed to indicate an insulation's susceptibility to crazing and cracking under severe conditions. It was discovered that magnet wires which would exhibit no crazing or cracking upon being wound about mandrels having relatively small diameters, for example, 1X mandrels, would exhibit crazing or cracking upon being wound about larger diameter mandrels. Further, it was discovered that additional crazing and/or cracking occurred after ageing, for example, after being held in stock for some time. Such "shelf ageing" is particularly important since magnet wire may be held in stock for several years before use.

The term "crazing" as used herein refers to hair-line cracks in the insulation. The term "cracking" as used herein refers to the film opening in one or more places to expose the bare conductor to view.

The "bottle test" consists of winding a length of magnet wire around a four ounce glass bottle. The specific bottle used had an O.D. of about 1¾ to 2 inches and the magnet wire was wound around the bottle ten times. The magnet wire was inspected by viewing the wire with a 45 power microscope after 48 hours of shelf ageing at ambient temperatures and pressures.

A comparison between the data of Table II related to Examples I through VI and the remaining Examples clearly indicate the superiority of the insulation system and the magnet wire of the invention. Examples I through VI are in accordance with U.S. Pat. No. 3,528,852. The most surprising comparison relates to the complete lack of crazing of the insulation system and magnet wire of the invention, whereas crazing ranging from a slight craze to cracking was exhibited in Examples I through VI. Further, better physical properties, predominantly in terms of snap and flexibility, better thermal properties, predominantly in terms of heat shock, and an improved dielectric strength is also shown by the data in Table II.

A further comparison between Examples VII through XXXIV illustrates the various forms of the insulation system and magnet wire of the invention. For example, Examples VII through XII and Examples XIII and XIV illustrate the use of differently modified phenoxy resins and amide-imide resins. The phenoxy resin solution of Examples VII through XII is selectively cross-linked to a higher degree and utilizes a different solvent system than the phenoxy resin utilized in Examples XIII and XIV. The amide-imide resin utilized in Examples VII through XII is processed using a slightly different method than that used in Examples XIII and XIV. Further variety in the phenoxy resin formulation is shown in Examples XVII and XVIII. This phenoxy resin is selectively cross-linked to a lesser degree than the phenoxy resin utilized in Examples VII through XII. The phenoxy resin solution used in Examples XV and XVI represents the highest degree of selective cross-linking of the phenoxy resin shown in the Examples and also illustrates the use of a different phenoxy resin. See also Examples XIX and XX.

The use of different materials to selectively cross-link the phenoxy resin is illustrated by comparing Examples VII through XVIII with Examples XIX, XX and XXIII through XXVIII. The use of different polyaromatic, polycarboxylic aromatic imide resins is illustrated by comparing Examples VII through XX and XXIII through XXVIII with Examples XXI and XXII.

The comparison of Examples VII through XXII with Examples XXIII through XXX illustrate the differences of an insulation system comprising an inner layer of phenoxy and an outer layer of imide resin with an insulation system comprising an inner layer of imide resin and an outer layer of phenoxy resin. Similarly, a comparison of Examples VII through XXII and Examples XXXI through XXXIV illustrate the differences of an insulation system comprising an inner layer of phenoxy resin and an outer layer of imide resin and an insulation system comprising an inner layer of imide resin, an outer layer of imide resin and a mediate layer of phenoxy resin. Comparison also should be made with Examples XXIII through XXX which illustrate an insulation system comprising an inner layer of imide resin and an outer layer of phenoxy resin. The insulation system of the invention provides an improved insulation system and magnet wire which has special utility in oil-filled transformers. The multi-layered magnet wire of the invention is shown to be superior over conventional Formvar, epoxy and acrylic resins and to be a significant advance even when compared to the closest prior art. The latter is shown even though the prior art would lead one to a different conclusion.

The disclosure hereinabove is not to be interpreted as limiting the invention to specific materials disclosed in the Examples. Any phenoxy resin prepared from bisphenol A and epichlorohydrin having a molecular weight in excess of about 15,000 is useful in the invention. Further, any polyaromatic, polycarboxylic aromatic imide resins which are linear polyimide or polyamide-imide resins are useful in the invention. A myriad of compounds can be used to selectively cross-link the phenoxy resins of the invention and a myriad of solvent compositions can be used to place the resins of the invention in solution in order to apply the resin to a conductor in the manufacture of the magnet wire of the invention. Any aromatic polyfunctional material having reactive groups capable of reacting with phenoxy hydroxyl groups can be used to cross-link the phenoxy resins of the invention. These materials include methylol containing resins, isocyanates, isocyanurates, urethanes, melamines, anhydrides, formaldehydes and diamines. Each of these materials can be used in the Examples in equal molar amounts in substitution for the isocyanates, isocyanurates, melamines, formaldehydes and diamines required thereby. Generally any solvent system can be used which will place the resins of the invention in solution and which can be eliminated therefrom upon baking and curing without thermal degradation of the resins and which are compatible with both the phenoxy and polyaromatic, polycarboxylic aromatic amide resins of the invention. Clearly, other methods of application can be used. The Examples herein are believed to be similar, as nearly as possible, to conventional commercially used techniques in the production of magnet wire. All of the materials used in the Examples are available commercially or used commercially.

While there have been described above the principles of this invention in connection with specific embodiments it is to be clearly understood that this description is made only by way of example and not as a limitation to the scope of the invention.

TABLE I

| | Example XXIV | Formvar | Epoxy | Acrylic |
|---|---|---|---|---|
| Conductor | Al | Al | Al | Al. |
| Physical properties: | | | | |
| Snap 1X | OK | OK | OK | OK. |
| Repeated scrape, strokes | 50 | 20 | 14 | 19. |
| Craze test (4%–1 day) | OK | Slight craze | Craze | OK. |
| Solvent test, cellosolve-xylene | Pass | Fail | Fail | Pass. |
| Thermal properties: | | | | |
| Heat shock, 20% 3X½ hr. at 220° C | do | Pass | Craze | Pass. |
| NEAM cut-thru, °C | 350 | 220 | 212 | 294. |
| VP cut-thru at 240° C., lbs | 30 | 12 | 10 | 9. |
| NEMA overload (OFM) | 4.5 | 41 | 4.2 | 1.2. |
| Fusion test (1 hr. at 160° C.) | No stick | Fuse | Fuse | Fuse. |
| Electrical properties: | | | | |
| Dielectric strength (twisted pairs), volts/mil | 3,800 | 3,400 | 4,000 | 2,400. |
| 3,000 volt continuity (faults/100 feet) | 0–1 | 0–2 | 0–1 | >25. |

TABLE II

| Example | I | II | III | IV | V | VI |
|---|---|---|---|---|---|---|
| Conductor (AWG size) | Copper (18) | Aluminum (18) | Copper (18) | Aluminum (18) | Copper (18) | Aluminum (18). |
| Speed, ft./min | 33 | 33 | 36 | 36 | 39 | 39. |
| Coatability | (1) | (1) | (1) | (1) | (1) | (1). |
| Oven temperatures, °F | 625–725–835 | 625–725–835 | 625–725–835 | 628–725–835 | 625–725–835 | 625–725–835. |
| Build | Heavy | Heavy | Heavy | Heavy | Heavy | Heavy. |
| Physical properties: | | | | | | |
| Snap | Pass | Pass | Checking | Checking | Checking | Checking. |
| Snap 1X | Cracks 3X | Cracks 3X | Cracks 3X | Cracks 3X | Cracks 3X | Cracks 3X. |
| Elongation, percent | 36 | 20 | 34 | 20 | 37 | 20. |
| Flexibility, 20% 1X | Cracks 0%–1X | Cracks 0%–1X | Cracks 0%–1X | Cracks 0%–1X | Cracks 0%–1X | Cracks 0%–1X. |
| Unilateral scrape, grams | 1,310 | 1,230 | 1,190 | 1,200 | 1,210 | 1,260. |
| Craze (bottle test) | Slight craze | Slight craze | | Severe craze and cracking | | |
| Thermal properties: | | | | | | |
| Heat shock, 20% 3×½ hr. at 220°C | Cracks | Cracks | Cracks | Cracks | Cracks | Cracks. |
| NEMA cut-thru, °C | 250 | 353 | 270 | 314 | 300 | 329. |
| Electrical properties: Dielectric strength at R.T., volts | 10,340 | 11,670 | 8,766 | 9,300 | 8,933 | 9,570. |

| Example | XII | VIII | IX | X | XI | XII |
|---|---|---|---|---|---|---|
| Conductor (AWG size) | Copper (18) | Aluminum (18) | Copper (18) | Aluminum (18) | Copper (18) | Aluminum (18). |
| Speed, ft./min | 33 | 33 | 36 | 36 | 39 | 39. |
| Coatability | Smooth | Smooth | Smooth | Smooth | Smooth | Smooth. |
| Oven temperatures, °F | 625–725–825 | 625–725–825 | 625–725–825 | 625–725–825 | 652–725–825 | 625–725–825. |
| Build | Heavy | Heavy | Heavy | Heavy | Heavy | Heavy. |
| Physical properties: | | | | | | |
| Snap | Pass | Pass | Pass | Pass | Pass | Pass. |
| Snap 1X | OK 2X | OK | OK 3X | OK | OK 3X | OK. |
| Elongation, percent | 35 | 20 | 33 | 21 | 38 | 28. |
| Flexibility, 20% 1X | OK | OK | OK | OK | OK | OK. |
| Unilateral scrape, grams | 1,350 | 1,350 | 1,350 | 1,350 | 1,320 | 1,320. |
| Craze (bottle test) | None | None | None | None | None | None. |
| Thermal properties: | | | | | | |
| Heat shock, 20% 3× ½ hr. at 220°C | Pass | Pass | Pass | Pass | Pass | Pass. |
| NEMA cut-thru, °C | 299 | 358 | 297 | 339 | 280 | 336. |
| Electrical properties: Dielectric strength at R.T., volts | 12,340 | 12,460 | 12,990 | 12,800 | 10,000 | 11,300. |

| Example | XIII | XIV | XV | XVI | XVII |
|---|---|---|---|---|---|
| Conductor (AWG size) | Copper (13½) | Aluminum (13½) | Copper (10) | Aluminum (10) | Copper (18). |
| Speed, ft./min | 23 | 23 | 15 | 15 | 35. |
| Coatability | Smooth | Smooth | Smooth | Smooth | Smooth. |
| Oven temperatures, °F | 500–700–800 | 500–700–800 | 475–600–700 | 475–600–700 | 550–710–825. |
| Build | Heavy | Heavy | Heavy | Heavy | Heavy. |
| Physical properties: | | | | | |
| Snap | Pass | Pass | Pass | Pass | Pass. |
| Snap 1X | OK 2X | OK | OK 2X | OK 3X | OK 2X. |
| Elongation, percent | 37 | 17 | 38 | 20 | 37. |
| Flexibility, 20% 1X | OK | OK | OK | OK 3X | OK. |
| Unilateral scrape, grams | 1,250 | 1,280 | 1,290 | 1,350 | 1,420. |
| Craze (bottle test) | None | None | None | None | None. |
| Thermal properties: | | | | | |
| Heat shock, 20% 3×½ hr. at 220°C | Pass | Pass | Pass | Pass | Pass. |
| NEMA cut-thru, °C | 262 | 362 | | | 312. |
| Electrical properties: Dielectric strength at R.T., volts | 11,000 | 11,250 | 12,100 | 11,300 | 10,500. |

| Example | XVIII | XIX | XX | XXI | XXII |
|---|---|---|---|---|---|
| Conductor (AWG size) | Aluminum (18) | Cooper (10) | Aluminum (10) | Copper (18) | Aluminum (18). |
| Speed, ft./min | 35 | 15 | 15 | 35 | 35. |
| Coatability | Smooth | Smooth | Smooth | Smooth | Smooth. |
| Oven temperatures, °F | 550–710–825 | 475–600–700 | 475–600–700 | 550–710–875 | 550–710–875. |
| Build | Heavy | Heavy | Heavy | Heavy | Heavy. |
| Physical properties: | | | | | |
| Snap | Pass | Pass | Pass | Pass | Pass. |
| Snap 1X | OK | OK 3X | OK 2X | OK 3X | OK. |
| Elongation, percent | 30 | 30 | 20 | 34 | 36. |
| Flexibility, 20% 1X | OK | OK 3X | OK 3X | OK | OK. |
| Unilateral scrape, grams | 1,170 | 1,166 | 1,190 | 1,120 | 1,150. |
| Craze (bottle test) | None | None | None | None | None. |
| Thermal properties: | | | | | |
| Heat shock, 20% 3×½ hr. at 220°C | Pass | Pass | Pass | Pass | Pass. |
| NEMA cut-thru, °C | 344 | | | 280 | 336. |
| Electrical properties: Dielectric strength at R.T., volts | 11,970 | 11,766 | 11,600 | 9,200 | 9,800. |

| Example | XXIII | XXIV | XXV | XXVI | XXVII | XXVIII |
|---|---|---|---|---|---|---|
| Conductor (AWG size) | Copper (10) | Aluminum (10) | Copper (10) | Aluminum (10) | Copper (10) | Aluminum (10). |
| Speed, ft./min | 12 | 12 | 15 | 15 | 18 | 18. |
| Coatability | Smooth | Smooth | Smooth | Smooth | Smooth | Smooth. |
| Oven temperatures, °F | 475–600–700 | 475–600–700 | 475–600–700 | 475–600–700 | 475–600–700 | 475–600–700. |
| Build | Heavy | Heavy | Heavy | Heavy | Heavy | Heavy. |
| Physical properties: | | | | | | |
| Snap | Pass | Pass | Pass | Pass | Pass | Pass. |
| Snap 1X | OK 3X | OK 2X | OK 3X | OK 2X | OK 3X | OK 3X. |
| Elongation, percent | 35 | 19 | 30 | 20 | 31 | 21. |
| Flexibility, 20% 1X | OK 3X | OK3X | OK 3X | OK 3X | OK 3X | OK 3X. |
| Unilateral scrape, grams | 1,180 | 1,260 | 1,166 | 1,190 | 1,133 | 1,180. |
| Craze (bottle test) | None | None | None | None | None | None. |
| Thermal properties: | | | | | | |
| Heat shock, 20% 3× ½ hr. at 220°C | Pass | Pass | Pass | Pass | Pass | Pass. |
| NEMA cut-thru, °C | | | | | | |
| Electrical properties: Dielectric strength at R.T., volts | 11,100 | 11,400 | 11,766 | 11,600 | 10,100 | 9,960. |

TABLE II—Continued

| Example | XXIX | XXX | XXXI | XXXII | XXXIII | XXXIV |
|---|---|---|---|---|---|---|
| Conductor (AWG size) | Copper (10) | Aluminum (10) | Copper (13½) | Aluminum (13½) | Copper (18) | Aluminum (18). |
| Speed, ft./min | 15 | 15 | 23 | 23 | 36 | 36. |
| Coatability | Smooth | Smooth | Smooth | Smooth | Smooth | Smooth. |
| Oven temperatures, °F | 475-600-700 | 475-600-700 | 500-700-800 | 500-700-800 | 625-725-825 | 625-725-825. |
| Build | Heavy | Heavy | Heavy | Heavy | Heavy | Heavy. |
| Physical properties: | | | | | | |
| Snap | Pass | Pass | Pass | Pass | Pass | Pass. |
| Snap 1X | OK 3X | OK 3X | OK 2X | OK | OK | OK. |
| Elongation, percent | 20 | 20 | 17 | 17 | 24 | 24. |
| Flexibility, 20% 1X | OK | OK 3X | OK | OK | BP 1X | BP 1X. |
| Unilateral scrape, grams | 1,170 | 1,230 | 1,272 | 1,280 | 1,290 | 1,340. |
| Craze (bottle test) | None | None | None | None | None | None. |
| Thermal properties: | | | | | | |
| Heat shock, 20% 3X½ hr. at 220° C | Pass | Pass | Pass | Pass | Pass | Pass. |
| NEMA cut-thru, °C | | | 298 | 362 | 312 | 357. |
| Electrical properties: Dielectric strength at R.T., volts | 12,260 | 12,400 | 11,900 | 12,560 | 11,850 | 12,600. |

[1] Occasional blister—all cures.

What is claimed is:

1. A metal conductor coated with layers of a cured, essentially linear phenoxy resin, and an essentially linear polyaromatic, polycarboxylic aromatic imide resin selected from the group consisting of polyamide-imide reaction products of the anhydrides of aromatic polycarboxylic acids having three carboxylic acid groups thereon and aromatic diisocyanates and polyimide reaction products of the anhydrides of aromatic polycarboxylic acids having four carboxylic acid groups thereon and aromatic difunctional compounds having anhydride reactive groups thereon, said phenoxy resin having a molecular weight when applied of at least 15,000 and essentially no epoxy groups therein, said layers being superposed and applied and baked and cured at the same conditions without any layer suffering thermal and solvent degradation, said layers in combination being continuous and flexible, of high dielectric strength and high resistance to hydrolysis, essentially free from crazing and of high scrape resistance.

2. The conductor of claim 1 wherein said penoxy resin is a reaction product of bisphenol A and epichlorohydrin having a formula

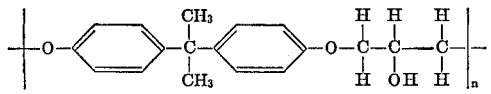

where n is greater than about 75.

3. The conductor of claim 1 wherein said polyaromatic, polycarboxylic aromatic amide is selected from the group consisting of polyamide-imides and polyimides of benzene polycarboxylic acids having at least three carboxylic acid groups.

4. The conductor of claim 1 wherein said phenoxy resin is selectively cross-linked by reacting said phenoxy resin with aromatic polyfunctional materials having reactive groups capable of reacting with phenoxy hydroxyl groups.

5. The conductor of claim 4 wherein said phenoxy resin is modified with resins selected from the group consisting of methylol containing resins, isocyanates, isocyanurates, urethanes, melamines, anhydrides, formaldehydes and diamines.

6. The metal conductor of claim 5 wherein said resins comprise from about 18.5 to about 50.0% weight of said phenoxy resin.

7. The conductor of claim 4 wherein said amide-imide reaction products include amide-imides of trimellitic acid.

8. The conductor of claim 7 wherein said amide-imide reaction products are the reaction products of equal molar amounts of trimellitic anhydride and p,p'-diphenylmethane diisocyanate.

9. The conductor of claim 4 wherein said imide reaction products include imides of benzene tetracarboxylic acids.

10. The conductor of claim 9 wherein said imide reaction products are the reaction products of pyromellitic dianhydride and oxydianiline.

11. The conductor of claim 1 wherein said coated conductor is a magnet wire formed into a coil.

12. The conductor of claim 11 wherein said coil is the coil of an oil-filled transformer.

13. The conductor of claim 1 wherein said layer of polyaromatic, polycarboxylic aromatic imide resin is applied to said conductor, and said layer of phenoxy is superposed on said imide layer.

14. The conductor of claim 13 wherein a second layer of a polyaromatic polycarboxylic aromatic imide resin is superposed on said layer of phenoxy resin, thereby sandwiching said phenoxy layer between two separate layers of said imide resin.

15. The conductor of claim 1 wherein said layer of phenoxy resin is applied to said conductor, and said layer of polyaromatic polycarboxylic aromatic imide resin is superposed on said phenoxy layer.

16. The metal conductor of claim 15 wherein said phenoxy resin is a reaction product of bisphenol A and epichlorohydrin having a formula

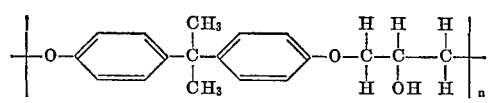

where n is greater than about 75; said polyaromatic, polycarboxylic aromatic amide is selected from the group consisting of polyamide imides and polyimides of benzene polycarboxylic acids having at least three carboxylic acid groups, and said phenoxy resin is modified with resins selected from the group consisting of methylol containing resins, isocyanates, isocyanurates, urethanes, melamines, anhydrides, formaldehydes and diamines.

References Cited

UNITED STATES PATENTS

| 3,220,882 | 11/1965 | Lavin et al. | 117—232 X |
| 3,306,771 | 2/1967 | Schmidt et al. | 117—218 |
| 3,528,852 | 9/1970 | Olson et al. | 117—232 X |
| 3,726,712 | 4/1973 | Rieck et al. | 117—232 X |
| 3,177,089 | 4/1965 | Marshall et al. | 117—75 X |
| 3,177,090 | 4/1965 | Bayes et al. | 117—75 X |
| 3,229,023 | 1/1966 | Bolton et al. | 336—94 X |

RALPH HUSACK, Primary Examiner

U.S. Cl. X.R.

117—232; 336—94

UNITED STATES PATENT OFFICE
CERTIFICATE OF CORRECTION

Patent No. 3,822,147  Dated July 2, 1974

Inventor(s) Ernest C. Koerner et al

It is certified that error appears in the above-identified patent and that said Letters Patent are hereby corrected as shown below:

Column 1, Line 65, change "estimate" to --estimated--.
Column 2, Line 56 & 57, change "degradiation" to
   --degradation--.
Column 6, Line 59, after "(NJ-100" delete --)--.
Column 8, Line 33, change "(Beetle 27-8" to --(Beetle 227-8--
Column 11 and 12, Table I, under "Thermal Properties"
   after Heat shock, 20% 3x1/2 hr at 220°C, under the
   Column headed "Example XXIV", "do" should be --pass--.
Column 11 and 12, Table I, under "Thermal Properties"
   after "NEMA overload (OFM)" under the heading
   "Formvar", "41" should be --41--.
Column 13 and 14, line 20, "XII" first occurrence,
   should be --VII--.
Column 13 and 14, Line 76, "vots" should be --volts--.

Signed and Sealed this sixteenth Day of March 1976

[SEAL]

Attest:

RUTH C. MASON
Attesting Officer

C. MARSHALL DANN
Commissioner of Patents and Trademarks